United States Patent [19]
Bauer

[11] Patent Number: 5,209,316
[45] Date of Patent: May 11, 1993

[54] TRUCK CAB SUSPENSION UNIT

[75] Inventor: David R. Bauer, Brookfield, Wis.

[73] Assignee: Applied Power Inc., Butler, Wis.

[21] Appl. No.: 778,421

[22] Filed: Oct. 16, 1991

[51] Int. Cl.⁵ .......................................... B62D 33/067
[52] U.S. Cl. ................................ 180/89.14; 267/64.11
[58] Field of Search .................. 267/64.11, 64.27, 122, 267/218; 248/618, 580, 583; 180/89.14; 280/716, 711; 296/190

[56] References Cited

U.S. PATENT DOCUMENTS

| | | | |
|---|---|---|---|
| 2,971,771 | 2/1961 | Jewell | 280/716 |
| 3,133,745 | 5/1964 | Granning | 280/711 |
| 3,227,470 | 1/1966 | Funk | 267/64.27 |
| 3,618,692 | 11/1971 | Stikeleather | 180/89.14 |
| 3,881,713 | 5/1975 | Joyce | 267/131 |
| 3,948,341 | 4/1976 | Foster | 180/89.14 |
| 4,294,324 | 10/1981 | Kimball et al. | 180/89.14 |
| 4,513,845 | 4/1985 | Stephens et al. | 188/299 |
| 4,807,713 | 2/1989 | Smith et al. | 180/89.14 |
| 4,871,189 | 10/1989 | Van Breemen | 280/711 |
| 4,989,684 | 2/1991 | Conaway | 180/89.15 |
| 5,114,178 | 5/1992 | Baxter | 280/716 |

FOREIGN PATENT DOCUMENTS 562497 6/1960 Belgium ............................. 280/711
918050 1/1947 France .............................. 267/64.11

Primary Examiner—Karin L. Tyson
Attorney, Agent, or Firm—Quarles & Brady

[57] ABSTRACT

A suspension unit for supporting a cab on the chassis of a truck has two U-shaped yokes, one with arms extending down and the other with arms extending up. The arms of one yoke are nested within the arms of the other in a sliding fit and a bearing in a vertical slot connects each pair of adjacent arms. An air spring and one or two shock absorbers can be mounted between the yokes. A guideway having a bottoming rib or a stop element with a cushioning pad is formed on one of the arms of each adjacent pair and the other arm of the corresponding pair is received within the guideway and abuts the bottoming rib or stop element in a fully compressed position to prevent excessive loads on the air spring, shock absorbers and bearings. The unit is mounted on a truck between the cab and chassis with one pair of adjacent arms fore and the other pair aft, to provide relatively free vertical movement, pivoting about a fore and aft axis, and fore and aft translational rigidity of the truck cab relative to the chassis.

14 Claims, 2 Drawing Sheets

TRUCK CAB SUSPENSION UNIT

FIELD OF THE INVENTION

This invention relates to devices for supporting the cab of a truck on a truck chassis and isolating the cab from shock and vibration which the chassis is subjected to.

BACKGROUND OF THE INVENTION

In "cab-over" trucks, the engine of the truck is positioned beneath the cab and the cab is tiltable, usually about a horizontal axis located at the front of the cab, to gain access to the engine for service. The front pivot axis may be either fixed to the chassis of the truck, which is known in the art as a "hard mount", or, as is more common in Europe, may be attached to the chassis by shock and vibration isolation mounts. However, regardless of whether isolation mounts are used to affix the front pivot axis to the chassis or cab, isolation mounts are typically used to support the rear of the cab on the chassis.

Prior truck cab suspension units have employed combinations of springs and shock absorbers to support the cab on the chassis while resisting the communication of shocks and vibrations from the chassis to the cab. In some of these devices, air springs have been employed, which are connected to the compressed air supply of the truck. The pressure inside these air springs is typically controlled by a height control valve, which maintains the extension of the spring constant regardless of the weight of the load carried in the cab.

However, air springs and shock absorbers are not alone sufficient in themselves to effectively support the rear of a tilt cab on a truck chassis. While there is considerable rigidity in the chassis and in the cab from their own structural components, the dynamic forces which the cab and chassis are subjected to during acceleration, braking and cornering make it desirable for the suspension units to have some rigidity of their own.

SUMMARY OF THE INVENTION

The present invention recognizes that it is desirable for a truck cab suspension unit to be relatively free to extend or retract vertically, relatively rigid in the fore and aft direction, and relatively free to pivot top to bottom about a horizontal fore and aft extending axis. Free vertical movement allows the suspension unit to absorb shocks and vibrations, which are primarily transmitted vertically. Relative rigidity fore and aft helps counteract forces to which the chassis is subjected during braking, acceleration and other maneuvers. The ability to pivot side to side allows the cab to "pitch and roll" during cornering which is desirable in trucks of this type.

The invention accomplishes these objectives in a truck cab suspension unit which is compact, inexpensive to manufacture and adaptable to many different applications. The unit has two yokes, each having a bridge portion and a pair of laterally spaced arms extending in the same direction from the corresponding bridge portion. The arms of one yoke fit inside of and are adjacent to the arms of the other yoke in sliding contact, so that one arm of each yoke cooperates with the corresponding arm of the other yoke to define a lateral side of the unit, with the bridge portions defining top and bottom sides of the unit. An elongated slot formed in one of the arms on each lateral side of the unit extends in the direction from one bridge portion to the other bridge portion. A bearing is secured to the other of the arms on each lateral side of the unit and is received in the elongated slot of the adjacent arm. Means are provided for mounting a spring between the bridge portions, one of the yokes to a truck cab and the other yoke to the truck chassis. This construction affords the desired degrees of freedom and rigidity between the truck cab and chassis in a very affordable and compact package.

In a preferred aspect, means are also provided for mounting a shock absorber between the yokes, and a shock absorber may be mounted on either or both lateral sides to further expand the variety of applications in which a suspension unit of the invention may be employed.

In another useful aspect, stop means is secured to one of the yokes on each lateral side of the unit to abut the end of the arm of the other yoke at that side at a fully compressed limit of travel of one yoke relative to the other. This feature protects the spring, any shock absorbers and the bearings from over travel which may otherwise be caused when the suspension unit is subjected to an excessive load. The stop means may be an abutment rib formed on the surface of one of the arms on each lateral side or a stop element having an elastomeric pad for cushioning the impact of the yokes bottoming on one another.

In another aspect, a guideway is formed on one of the arms on each lateral side of the unit within which the other arm on that side is received. The guideway serves to generally align the two yokes vertically, in case the stiffness of the unit itself is insufficient for that purpose, for accurate positioning of the two yokes relative to one another to facilitate automatic alignment for latching of the unit to the truck cab or chassis.

A suspension unit of the invention is especially preferred to be adapted to incorporate an air spring. The air spring can be automatically leveled by conventional means, which beneficially serves to automatically center the bearing on each lateral side within the elongated slot under steady state load conditions.

The full benefits of a suspension unit of the invention are realized when it is mounted on a truck oriented such that one lateral side of the unit is substantially fore and the other lateral side of the unit is substantially aft with respect to the fore and aft directions defined by the truck. In this orientation relative to the truck, the pivot axis of one yoke relative to the other extends substantially fore and aft. This provides translational rigidity fore and aft, free vertical translation of one yoke relative to the other (except for the resistance provided by the spring and any shock absorbers), and relatively free rotation of one yoke relative to the other about a fore and aft extending axis, to result in the dynamic structural characteristics sought in mounting a cab to a chassis of a truck.

Many other features and advantages of the invention will become apparent from reading the following description and drawings.

DETAILED DESCRIPTION OF THE PREFERRED EMBODIMENT

Figure 1:
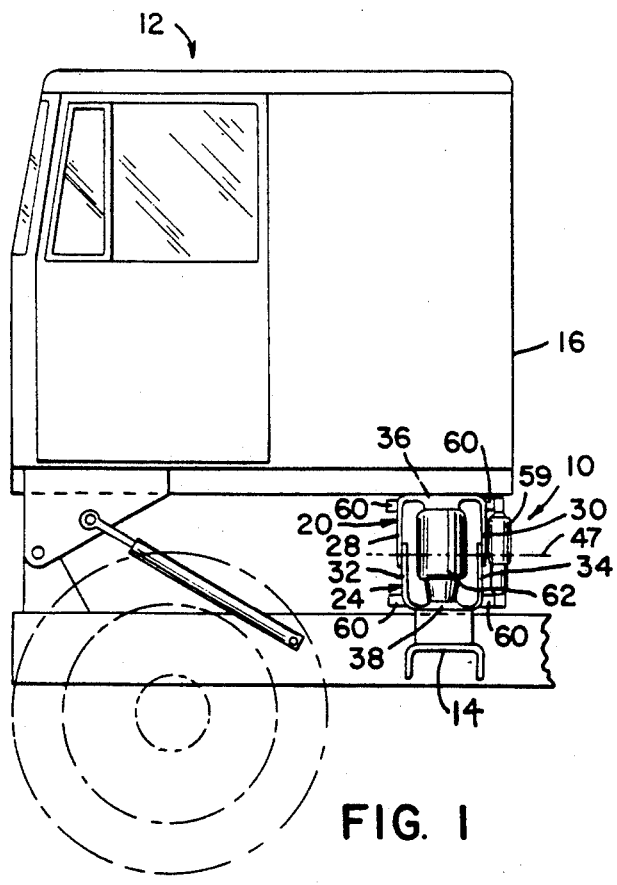
FIG. 1 is schematic right side elevation view of a truck cab suspension unit of the invention mounted on a truck.
Figure 2:
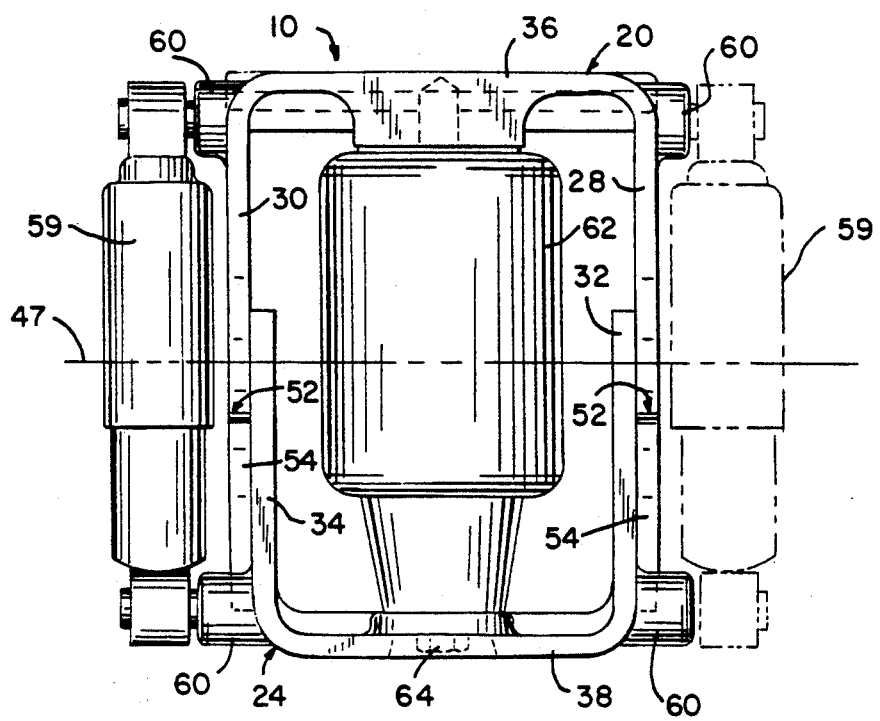
FIG. 2 is a left side elevation view of the unit of FIG. 1 with one shock absorber shown in full lines and one shown in phantom lines.
Figure 3:
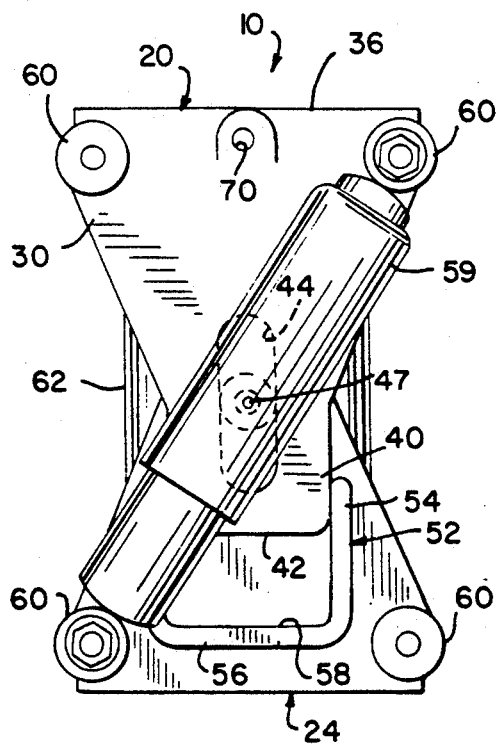
FIG. 3 is a rear elevation view of the unit of FIG. 1 with one shock absorber.

FIG. 1 illustrates a truck cab suspension unit 10 mounted on a truck 12 between the truck's chassis 14 and the truck cab 16. Referring also to FIG. 2, the truck cab suspension unit 10 includes a first yoke 20 and a second yoke 24. As shown in FIG. 2, the first yoke 20 is on top, adjacent to the cab 16, and the second yoke 24 is on the bottom, adjacent to the chassis 14, so that the first yoke 20 would be secured to the truck cab 16 and the second yoke 24 would be secured to the truck chassis 14.

Figure 5:
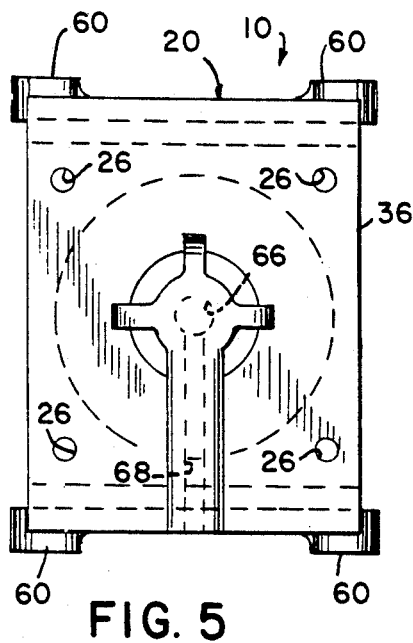
FIG. 5 is a top elevation view of the unit of FIG. 1 without any shock absorbers.
Figure 6:
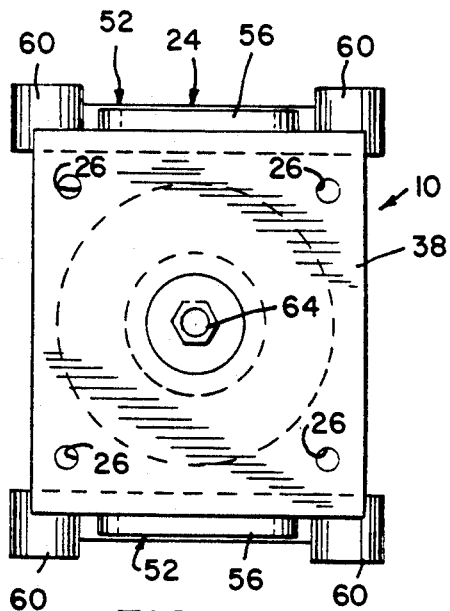
FIG. 6 is a bottom elevation view of the unit of FIG. 1 without any shock absorbers.

As shown in FIGS. 5 and 6, bolt holes 26 may be provided to secure the first and second yokes 20 and 24 to the truck cab 16 and chassis 14, or any other suitable means may be provided. In tilt cab trucks, where it is desirable to easily release the rear of the cab 16 from the chassis 14 so that the cab may be tilted up for access to the engine, either the first yoke 20 would be secured to the cab 16 or the second yoke 24 would be secured to the chassis 14 with a releasable connection such as a hydraulically operated latch like that disclosed in co-pending, commonly assigned U.S. patent application Ser. No. 07/778,420 entitled "Tilt Cab Latch" filed on the same day as this application, the disclosure of which is hereby incorporated by reference, now U.S. Pat. No. 5,176,417. If the first yoke 20 were secured with a releasable connection, then the unit 10 would remain secured to the chassis 14 when the cab was lifted. Conversely, if the second yoke 24 were secured with a releasable connection, the unit 10 would be lifted along with the cab 16.

Each of the yokes 20 and 24 has a pair of laterally spaced apart arms. On the first yoke 20, the arms are identified by reference numerals 28 and 30 and on yoke 24 the arms are identified by reference numerals 32 and 34. The arms 32 and 34 are laterally inside of and adjacent to the arms 28 and 30, with a sliding fit between the arms 28 and 32 and between the arms 30 and 34. A bridge portion 36 spans and is integral with the arms 28 and 30 and a bridge portion 38, opposite from the bridge portion 36, spans and is integral with the arms 32 and 34. The yokes 20 and 24 may be molded or cast from any suitable material, such as aluminum.

The arms 28 and 30 each extend in the same direction (i.e., downwardly as viewed in FIGS. 1–4) from the bridge portion 36, substantially perpendicularly to the bridge portion 36 and taper in the width therefrom. The unit 10 would normally be installed on the truck 10 so that the bridge portions 36 and 38 would be in spaced apart generally horizontal planes. Toward their lower ends 42, the arms 28 and 30 assume a uniform width dimension to form a way portion 40 on each arm 28 and 30 adjacent to their lower ends 42, where the arms 28 and 30 terminate.

Figure 4:
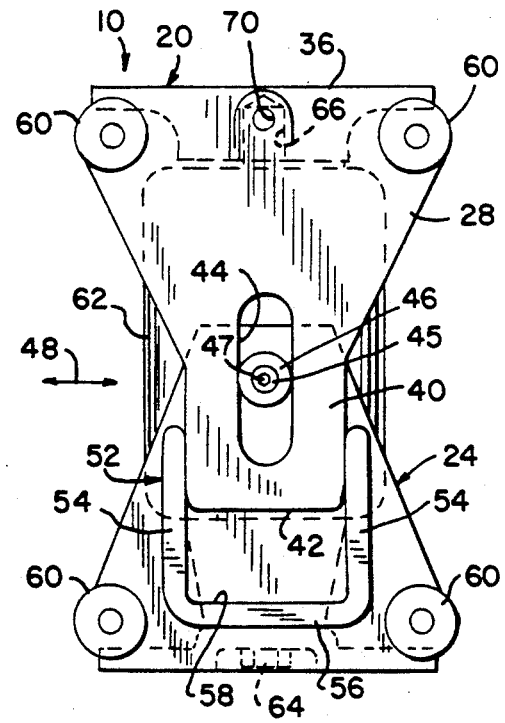
FIG. 4 is a front elevation view of the unit of FIG. 1 without any shock absorbers.

As best shown in FIG. 4, an elongated slot 44 is formed in each arm 28 and 30 having its major axis extending generally in the direction from one bridge portion 36 to the other bridge portion 38, i.e. extending generally vertically as shown in FIG. 4. The elongated slots 44 of the preferred embodiment are aligned from arm 28 to arm 30. The slots 44 also preferably are centered on a vertical axis of symmetry of the unit 10 and also preferably on a horizontal axis of symmetry, although it should be understood that the first yoke 20 may move vertically relative to the second yoke 24 within the vertical range of the slots 44.

Each arm 32 and 34 of second yoke 24 has a bearing 46 secured to it by any suitable means, such as by a bolt 45, and received within the elongated slots 44. The bearings 46 rotate about a common horizontal axis 47 (FIGS. 1–4). Preferably, the normal position of the bearings 46 at the design height of the unit 10 is such that the bearings 46 are centered vertically in the slots 44.

The bearings 46 allow the yokes 20 and 24 to move freely vertically relative to one another. However, the bearings 46 restrain the yokes 20 and 24 from moving side to side in the lateral direction indicated by arrow 48 in FIG. 4 relative to one another while still allowing pivotal movement about axis 47 of the first yoke 20 relative to the second yoke 24 to accommodate pitch and roll of the cab 16 relative to the chassis 14.

The way portions 40 of the arms 28 and 30 are received by guide ribs 52 formed on the outer sides of the arms 32 and 34 of the second yoke 24. Each guide rib 52 has side ribs 54 and a bottoming rib 56. The side ribs 54 are optional in some applications and serve only to generally align the first yoke 20 relative to the second yoke 24 vertically in the event that the stiffness of the unit 10 without the side ribs 54 does not sufficiently align the yokes 20 and 24 to allow positioning accurate enough to ensure proper latching when the truck cab 16 is re-secured to the truck chassis 14, for example after servicing the engine.

The bottoming rib 56 serves the function of limiting the downward travel of the first yoke 20 relative to the second yoke 24. Each bottoming rib 56 has a stop surface 58 which abuts the end 42 of the corresponding arm 28 or 30 at the fully compressed position of the unit 10. This serves to protect any shock absorbers 59, the air spring 62, and the bearings 46 from being subjected to excessive loads applied to the unit 10.

Bosses 60 are provided on the lateral sides of the unit 10 to allow for a mounting of one or more conventional shock absorbers 59 on the unit 10. In the event that two units 10 are mounted on the truck 12, typically one at or near each rear corner of the truck cab 16, it may be desirable to only use one shock absorber 59 for each unit as shown in full lines in FIGS. 1 and 2. If only one unit 10 is mounted centrally at the rear of a cab, then it may be desirable to provide the unit 10 with a second shock absorber 59 on the opposite lateral side, as shown in phantom lines in FIG. 2. Typically, if two shock absorbers 59 are provided on a single unit 10, they would be in crisscrossed orientation relative to one another as viewed from the front or rear, i.e., in the planes of FIGS. 4 and 3.

Each yoke 20 and 24 also includes means for mounting a spring between the bridge portions 36 and 38. In the preferred embodiment, an air spring 62 is employed between the bridge portions 36 and 38. Such air springs are well known and commercially available from Goodyear Tire & Rubber Company, Firestone Tire & Rubber Company and any of a number of other suppliers. An advantage of using an air spring is that it can be automatically adjusted by well known means to maintain the cab level regardless of the load carried by the cab. Thus, the air spring 62 is automatically adjusted to keep the spacing between the bridge portions 36 and 38 constant regardless of the load in the cab, which automatically tends to center the bearing 46 in the slot 44.

The lower end of the air spring 62 is secured by a bolt 64 which extends through the bridge portion 38 and is threaded into the end of the air spring 62. The upper end of the air spring 62 is provided with an inlet/exhaust nipple (not shown) which is threaded into a bore 66 in the bridge portion 36. The bore 66 is in communication via passage 68 with ports 70, one port 70 at the front end of passage 68 and one port 70 at the rear end of passage 68, which are threaded for connection to the compressed air source of the truck. In use, only one of the ports 70 may be connected to the compressed air source and the other port 70 plugged. In well known fashion, suitable control circuitry including a height control valve preferably regulates the pressure in air spring 62 to maintain a constant steady state spacing between the bridge portions 36 and 38 regardless of the load placed in the cab 16. Note that the unit 10 is typically mounted with the yoke 20, the larger diameter sleeve of the shock absorber 59 and the diaphragm end of the air spring 62 opening downwardly so as to prevent accumulations of foreign matter in the unit 10.

As best shown in FIG. 1, the unit 10 is mounted on a truck with one lateral side fore and the other lateral side aft so that the rotational axis 47 of the bearings 46 extends fore and aft. Thus, the lateral side of the unit which the arms 28 and 32 are on is fore and the lateral side of the unit which the arms 30 and 34 are on is aft. Mounted in this orientation on the truck 12 between the cab 16 and the chassis 14, the first yoke 20 can pivot relative to the second yoke 24 about axis 47 while simultaneously having a substantial vertical component to its movement relative to the yoke 24. At the same time, the first yoke 20 is restrained from moving fore and aft along the axis 47 relative to the second yoke 24 to resist fore and aft movements of the cab 16 relative to the chassis 14.

Figure 7:
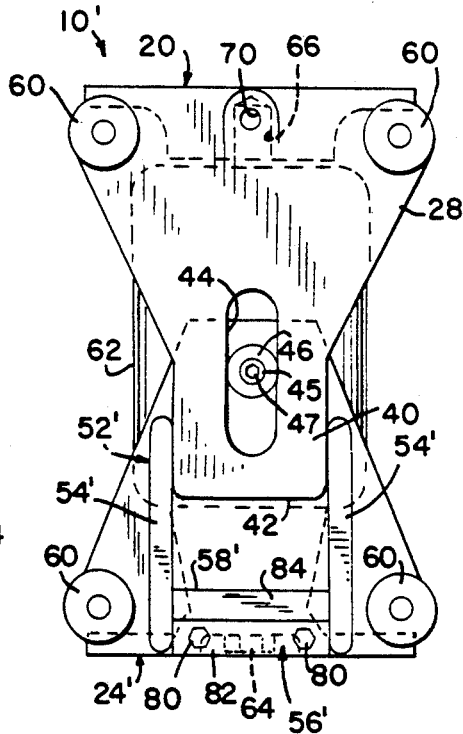
FIG. 7 is a front elevation view similar to FIG. 4 but showing a second embodiment of a truck cab suspension unit of the invention.

FIG. 7 illustrates a second embodiment 10' of a truck cab suspension unit of the invention. In the unit 10', reference numerals are applied according to the corresponding features of the unit 10. The only difference between the unit 10' and the unit 10 is that the guide ribs 52' on the front and rear of the unit are in a different configuration.

Only the guide ribs 52' on the front of the unit 10' are shown, it being understood that guide ribs 52' of the same construction are provided on the rear of the unit 10'. In the guide ribs 52', the side ribs 54' extend all the way to the bottom of the yoke 24' and a discrete stop element 56' is fastened to the yoke 24' in between the ribs 54' at the bottom of the yoke 24' by bolts 80. The stop element 56' is made of a foundation 82, through which the bolts 80 extend and which may be made of a suitable metal such as aluminum, and a cushioning pad 84.

The cushioning pad 84 is preferably made of a suitable elastomeric material, such as a urethane, and may be molded onto or otherwise suitably secured on top of the foundation 82. The pad 84 has a stop surface 58' which the end of the yoke 20 bottoms against at the lower limit of travel of the yoke 20 relative to the yoke 24'. The pad 84 is particularly advantageous when it is desired to cushion the impact of the yokes 20 and 24' bottoming.

Preferred embodiments of the invention have been described. Numerous modifications and variations of those embodiments will be apparent to those of skill in the art but which are still within the spirit and scope of the invention. For example, the slots 44 and bearings 46 could be reversed on either side or on both sides with the slots being provided in the inside arms and the bearings being secured to the outside arms. Therefore, the invention should not be limited by the scope of the foregoing, but only by the claims that follow.

I claim:

1. A truck cab suspension unit, comprising:
    a truck cab;
    a truck chassis;
    a first yoke having a bridge portion and a pair of laterally spaced arms extending in the same direction from said bridge portion;
    a second yoke having a bridge portion and a pair of laterally spaced arms extending in the same direction from said bridge portion, the arms of said second yoke fitting inside of and adjacent to the arms of the first yoke in sliding contact, one arm of each yoke cooperating with the corresponding arm of the other yoke to define the corresponding lateral side of the unit and the bridge portions of said yokes defining the top and bottom sides of said unit;
    an elongated slot formed in one of the arms on each lateral side of the unit, said slots extending in the direction from one bridge portion to the other bridge portion;
    a bearing secured to the other of the arms on each lateral side of the unit, said bearing being received in the elongated slot of the adjacent arm and permitting rotation of said first yoke relative to said second yoke about an axis of said bearing;
    a spring;
    means for mounting said spring between the bridge portions; and
    means for mounting one of said yokes to said truck cab and the other of said yokes to said truck chassis.

2. A truck cab suspension unit as in claim 1, further comprising means for mounting a shock absorber between said first and second yokes.

3. A truck cab suspension unit as in claim 2, wherein said shock absorber mounting means provides for mounting a shock absorber on either or both lateral sides of said unit.

4. A truck cab suspension unit as in claim 1, further comprising stop means secured to one of the arms on each lateral side of the unit to abut the end of the other arm on the same lateral side at a fully compressed limit of travel of one yoke relative to the other.

5. A truck cab suspension unit, comprising:
    a truck cab;
    a truck chassis;
    a first yoke having a bridge portion and a pair of laterally spaced arms extending in the same direction from said bridge portion;
    a second yoke having a bridge portion and a pair of laterally spaced arms extending in the same direction from said bridge portion, the arms of said second yoke fitting inside of and adjacent to the arms of the first yoke in sliding contact, one arm of each yoke cooperating with the corresponding arm of the other yoke to define the corresponding lateral side of the unit and the bridge portions of said yokes defining the top and bottom sides of said unit;

an elongated slot formed in one of the arms on each lateral side of the unit, said slots extending in the direction from one bridge portion to the other bridge portion;

a bearing secured to the other of the arms on each lateral side of the unit, said bearing being received in the elongated slot of the adjacent arm;

a spring;

means for mounting said spring between the bridge portions;

means for mounting one of said yokes to said truck cab and the other of said yokes to said truck chassis; and stop means secured to one of the arms on each lateral side of the unit to abut the end of the other arm on the same lateral side at a fully compressed limit of travel of one yoke relative to the other;

wherein said stop means comprises a rib formed on one arm on each lateral side of the unit.

6. A truck cab suspension unit, comprising:

a first yoke having a bridge portion and a pair of laterally spaced arms extending in the same direction from said bridge portion;

a second yoke having a bridge portion and a pair of laterally spaced arms extending in the same direction from said bridge portion, the arms of said second yoke fitting inside of and adjacent to the arms of the first yoke in sliding contact, one arm of each yoke cooperating with the corresponding arm of the other yoke to define the corresponding lateral side of the unit and the bridge portions of said yokes defining the top and bottom sides of said unit;

an elongated slot formed in one of the arms on each lateral side of the unit, said slots extending in the direction from one bridge portion to the other bridge portion;

a bearing secured to the other of the arms on each lateral side of the unit, said bearing being received in the elongated slot of the adjacent arm;

means for mounting a spring between the bridge portions;

means for mounting one of said yokes to a truck cab and the other of said yokes to a truck chassis; and stop means secured to one of the arms on each lateral side of the unit to abut the end of the other arm on the same lateral side at a fully compressed limit of travel of one yoke relative to the other, said stop means comprising a rib formed on one arm on each lateral side of the unit;

wherein a guideway is formed on one of the arms on each lateral side of the unit and the other arm on the same lateral side is received in a sliding fit within said guideway.

7. A truck cab suspension unit as in claim 4, wherein said stop means comprises a stop element including an elastomeric pad for cushioning the impact of said yokes bottoming on one another.

8. A truck cab suspension unit as in claim 1, wherein said spring is an air spring.

9. A truck cab suspension unit as in claim 1, wherein the elongated slots are formed in the arms of the first yoke and the bearings are secured to the arms of the second yoke.

10. A truck cab suspension unit as in claim 1, wherein said unit is mounted between said truck cab and said truck chassis oriented such that one lateral side of the unit is substantially fore and the other lateral side of the unit is substantially aft with respect to the fore and aft directions defined by the truck cab and chassis.

11. A truck cab suspension unit as in claim 1, wherein the bearings on the lateral sides of the unit have a common generally horizontal axis of rotation.

12. A truck cab suspension unit as in claim 11, wherein said unit is mounted between said truck cab and said truck chassis with said axis of rotation extending substantially in the fore and aft direction defined by the truck cab and chassis.

13. A truck cab suspension unit, comprising:

a first yoke having a bridge portion and a pair of laterally spaced arms extending in the same direction from said bridge portion;

a second yoke having a bridge portion and a pair of laterally spaced arms extending in the same direction from said bridge portion, the arms of said second yoke fitting inside of and adjacent to the arms of the first yoke in sliding contact, one arm of each yoke cooperating with the corresponding arm of the other yoke to define the corresponding lateral side of the unit and the bridge portions of said yokes defining the top and bottom sides of said unit;

an elongated slot formed in one of the arms on each lateral side of the unit, said slots extending in the direction from one bridge portion to the other bridge portion;

a bearing secured to the other of the arms on each lateral side of the unit, said bearing being received in the elongated slot of the adjacent arm and permitting rotation of said yokes relative to one another about an axis of said bearing;

means for mounting a spring between the bridge portions; and means for mounting one of said yokes to a truck cab and the other of said yokes to a truck chassis with one lateral side of the unit substantially fore and the other lateral side of the unit substantially aft with respect to the fore and aft directions defined by the truck.

14. A truck cab suspension unit as in claim 13, wherein the bearings on the lateral sides of the unit have a common generally horizontal axis of rotation and said axis of rotation extends substantially in the fore and aft direction defined by the truck.

* * * * *